US006549340B1

(12) United States Patent

Hirtzlin et al.

(10) Patent No.: US 6,549,340 B1

(45) Date of Patent: Apr. 15, 2003

(54) FOCUSING DEVICE COMPRISING A LUNEBERG LENS INCLUDING A HOMOGENEOUS VOLUME OF DIELECTRIC AND METHOD MATERIAL FOR MAKING SUCH A LENS

(75) Inventors: Patrice Hirtzlin, Rennes (FR); Christian Yves Allaire, La Dagueniére (FR); Ali Louzir, Rennes (FR); Luc Pagnier, D'Olonne (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/857,092

(22) PCT Filed: Nov. 30, 1999

(86) PCT No.: PCT/FR99/02961

§ 371 (c)(1),
(2), (4) Date: Aug. 22, 2001

(87) PCT Pub. No.: WO00/35050

PCT Pub. Date: Jun. 15, 2000

(30) Foreign Application Priority Data

Dec. 4, 1998 (FR) .......................................... 98 15363

(51) Int. Cl.[7] .......................... G02B 9/00; H01Q 15/24; B29C 65/00

(52) U.S. Cl. ................... 359/652; 359/654; 343/911 R; 343/911 L; 264/44

(58) Field of Search ................................ 359/652, 654; 342/11; 343/911 R, 911 L; 264/44; 428/325, 402

(56) References Cited

U.S. PATENT DOCUMENTS

| | | | | |
|---|---|---|---|---|
| 3,917,773 A | | 11/1975 | Gates, Jr. et al. | 264/44 |
| 4,288,337 A | * | 9/1981 | Ota et al. | 252/512 |
| 5,154,973 A | | 10/1992 | Imagawa et al. | 428/325 |
| 5,677,796 A | * | 10/1997 | Zimmerman et al. | 359/654 |
| 6,426,731 B2 | * | 7/2002 | Hirtzlin et al. | 343/911 R |
| 6,433,936 B1 | * | 8/2002 | Carpenter et al. | 359/652 |

FOREIGN PATENT DOCUMENTS

| | | | |
|---|---|---|---|
| WO | 93/10572 | 5/1993 | H01Q/19/06 |

* cited by examiner

*Primary Examiner*—Georgia Epps
*Assistant Examiner*—David N. Spector
(74) *Attorney, Agent, or Firm*—Joseph S. Tripoli; Kuniyuki Akiyama

(57) ABSTRACT

The invention relates to a focusing device comprising a Luneberg lens comprising a homogeneous volume of dielectric. It is characterized in that the dielectric comprises a granular agglomerate defined by a homogeneous granule size distribution of thermoplastic granules, at least one plurality of these granules being welded together by granule boundaries in order to keep said volume consolidated. Particular application to lenses for the tracking of nongeostationary satellites, of at least one geostationary satellite, or for use in an MMDS system.

24 Claims, 2 Drawing Sheets

FOCUSING DEVICE COMPRISING A LUNEBERG LENS INCLUDING A HOMOGENEOUS VOLUME OF DIELECTRIC AND METHOD MATERIAL FOR MAKING SUCH A LENS

This application claims the benefit under 35 U.S.C. § 365 of International Application PCT/FR99/02961, filed Nov. 30, 1999, which was published in accordance with PCT Article 21(2) on Jun. 15, 2000 in French.

BACKGROUND OF THE INVENTION

The invention relates to a focussing device comprising a Luneberg lens and its manufacturing process. It relates more particularly to a focussing device comprising a Luneberg lens comprising a homogeneous volume of dielectric.

It is known, from French patent applications No. 98/05111 and No. 98/05112 filed on Apr. 23, 1998 in the name of the applicant to use a Luneberg lens in satellite-signal receivers, especially for the tracking of nongeostationary satellites.

In theory, the lens must be composed of a given number of layers of dielectrics high enough to approach the ideal model of refractive index variation characteristic of the Luneberg lens. The refractive index n relating to a layer and the relative dielectric constant E (or permittivity) corresponding to it are therefore related by the equation: $n=E^{1/2}$. However, increasing the number of layers is limited in practice by strict manufacturing tolerances which are incompatible with a mass production process. For small-sized lenses, typically having a diameter of less than 40 cm for transmissions in the Ku band, one solution to this problem is to opt for a lens having a single layer of homogeneous dielectric.

For the purpose of reducing the overall size of the lens, it is therefore necessary to increase the density, with the disadvantageous consequence of increasing the weight of the lens. There must therefore necessarily be a compromise between the size of the lens and its weight. These volume and weight constraints impose a well-defined density range on the dielectric. For example, for a lens 35 cm in diameter, the allowed density is typically between 0.3 $g/cm^3$ to 0.8 $g/cm^3$.

It is known, from the prior art, to use, as dielectric, a compound comprising expanded polystyrene filled with high-density granules, ceramic or metal granules for example, in order to increase its density and to shift it toward the desired density range.

However, this type of compound does not allow there to be complete homogeneity of the granules in the compound, and therefore does not guarantee a homogeneous density within the volume of the lens. In addition, the compound obtained is expensive.

SUMMARY OF THE INVENTION

It is an object of the invention to remedy these drawbacks.

For this purpose, the subject of the invention is a focussing device comprising a Luneberg lens comprising a homogeneous volume of dielectric, characterized in that the dielectric comprises a granular agglomerate defined by a homogeneous granule size distribution of thermoplastic granules, at least one plurality of these granules being welded together by granule boundaries in order to keep said volume consolidated.

Thus, since the granules are placed one with respect to another in such a way that each of them is in contact with at least one other, the existence of solid granule boundaries makes it possible to fulfill the function of a binder between the various granules and to generate a compact assembly of granules.

DESCRIPTION OF THE PREFERRED EMBODIMENTS

According to one embodiment, said plurality of granules is included at least within an outer layer of said homogeneous volume, said outer layer being relative to the outer surface of the volume extended toward the inside of said volume to a predetermined depth, preferably of the order of a multiple of a received and/or transmitted half-wavelength. Consequently, the outer layer serves to keep the granules of material under pressure within the outer layer. In addition, the thickness of the outer layer defined as a multiple of a received and/or transmitted half-wavelength optimizes, from the electromagnetic standpoint, the exchange of signals with the outside of the lens and at the same time allows this lens to act as a radome.

Preferably, said plurality of granules is uniformly distributed within said volume. Thus, it is possible to ensure density homogeneity over the entire volume.

Advantageously, the permittivity $\epsilon_r$ of the lens of material composed of thermoplastic granules with a permittivity $\epsilon_{r0}$ is connected with a fill factor F, denoting the ratio of the volume actually occupied by the granules to the total volume of said volume, by the equation:

$$\epsilon_r=[(1+2F)\,\epsilon_{r0}+2(1-F)]/[(1-F)\,\delta_{r0}+2+F].$$

French patent applications No. 98/05111 and No. 98/05112 describe in particular primary sources close to the focussing surface of the lens. According to one embodiment, the focal length of the lens depends on the refractive index n of the lens and on the accepted phase variation over the aperture of the radiation pattern of the lens, the refractive index of the lens being given by:

$$n=\epsilon_r^{1/2}$$

In order to allow the radius of the lens to be increased and thus to decrease the focal length of the latter without increasing the phase variation over the aperture of the radiation pattern of the lens, at least one additional layer covers said homogeneous volume of dielectric, said additional layer also comprising an agglomerate of thermoplastic granules of a material differing from that of the granules of said volume and having a density less than that of said volume. In this way, by creating a gradation in the refractive indices from the outside of the lens toward the inside of the latter, it is possible to approach the ideal model of a Luneberg lens.

According to one embodiment, the granules of said volume are composed of polystyrene. Thus, the density of the lens is within the desired density range.

According to one embodiment, the granules of the second layer are composed of polypropylene.

In addition, the processes for converting thermoplastics (injection molding, thermoforming, rotomolding and compression molding) do not allow parts to be produced with a thickness greater than about fifteen millimeters. Furthermore, these processes entail density variations within the parts and, because of the phenomenon of material shrinkage, deformations and geometrical variations appear within the parts. These problems may, in particular, interfere with the proper operation of a lens as described above and implemented according to said processes.

It is also an object of the invention to solve these drawbacks and, more particularly, to provide a process for manufacturing a Luneberg lens comprising a homogeneous volume of dielectric.

For this purpose, the subject of the invention is a process for manufacturing a Luneberg lens comprising a homogeneous volume of dielectric, comprising a step of forming said volume, characterized in that the volume comprises a granular agglomerate defined by a homogeneous granule size distribution of thermoplastic granules and in that said process comprises the following steps:

- a step of heating the volume in order to raise the temperature of at least one outer layer of the volume to a transition temperature between the softening temperature of said material and the melting point of the material, the outer layer representing the outer layer of the volume extended into the volume to a predetermined depth and the transition temperature being defined by a phase change toward a viscous phase of at least part of said outer layer over said depth;
- a step of cooling said outer layer in order to harden said outer layer.

Thus, this hardened outer layer allows the material within the layer to be kept under pressure. The fact of not completely melting the thermoplastic allows the initial density of the thermoplastic to be maintained. Furthermore, using a thermoplastic is inexpensive.

Advantageously, during the heating step, the temperature is raised in order to melt at least the outer layer of the granules contained in said outer layer of the volume for the purpose of forming viscous granule boundaries binding the granules of the outer layer of the volume. Thus, the granules of the outer layer, arranged against one another and leaving room for voids forming an open porosity, are consolidated by the solidification, during the cooling, of the viscous granule boundaries encapsulating said granules. The fact of not entirely melting the granules of the outer layer makes it possible to allow air to flow sufficiently between them for rapid cooling. By virtue of this consolidation, the outer layer is converted into a shell keeping the granules of the volume under pressure.

According to one embodiment, the thickness of the outer layer is of the order of a multiple of a received and/or transmitted half-wavelength. This layer must have a thickness greater than a first value in order to be able to keep sufficient pressure on the mass of material that it contains.

Advantageously, the heating step is carried out until the entire volume has reached the transition temperature, the diffusion of the heat throughout the entire volume having the function of expanding all the granules. This expansion of the granules creates, within the volume, a pressure between the granules allowing the welding between the granules to be strengthened. Density homogeneity is provided throughout the volume.

According to one embodiment, the heating is carried out by convection. For example, the heating is carried out by blowing hot air.

To meet such thickness constraints, the heating time must be greater than a first temperature value in order to allow the outer layer of the granules of at least the outer layer of the volume to melt and must be less than a second temperature value in order to allow homogeneity of the volume as explained above.

According to another embodiment, the heating is carried out by radiation, for example ultrasonic radiation.

According to one embodiment, the process employs molding means for forming said volume, said molding means comprising porosities uniformly arranged over the outer surface of said molding means and the relative rotational speed of said molding means with respect to the blowing direction being less than a given speed in order to allow temperature homogeneity within at least the outer layer.

According to one embodiment, the molding means are vibrated in order to mix the material. Thus, better homogeneity is achieved.

According to one embodiment, the heating temperature and the heating and cooling times are adjusted according to the thermoplastic used and to the volume of thermoplastic to be obtained.

According to one embodiment, the process employs pressing means, the pressure of which depends on the desired material density in the volume.

According to one embodiment, at least one sheet of thermoplastic is thermoformed around the volume, in order to offer protection from external attack.

According to one embodiment, said volume is shaped so as to allow, in operation, a visibility in elevation of 10° to 90° and in azimuth of 360°.

According to one embodiment, the volume is spherical.

The subject of the invention is also a signal focussing device comprising a Luneberg lens having a homogeneous volume of dielectric, characterized in that the lens is produced by the process according to the invention.

According to one embodiment, said device is intended for the tracking of moving targets, especially nongeostationary satellites, for data exchange with at least one geostationary satellite, or for point-to-multipoint transmission, such as the Multipoint Multichannel Distribution System or MMDS.

BRIEF DESCRIPTION OF THE DRAWINGS

Further features and advantages of the present invention will become apparent from the description of the illustrative example of a device for implementing the process according to one embodiment of the invention which follows, together with one of its variants, given by way of nonlimiting examples, with reference to the appended figures in which.

To simplify the description, the same references will be used to denote components fulfilling identical functions.

Figure 1:
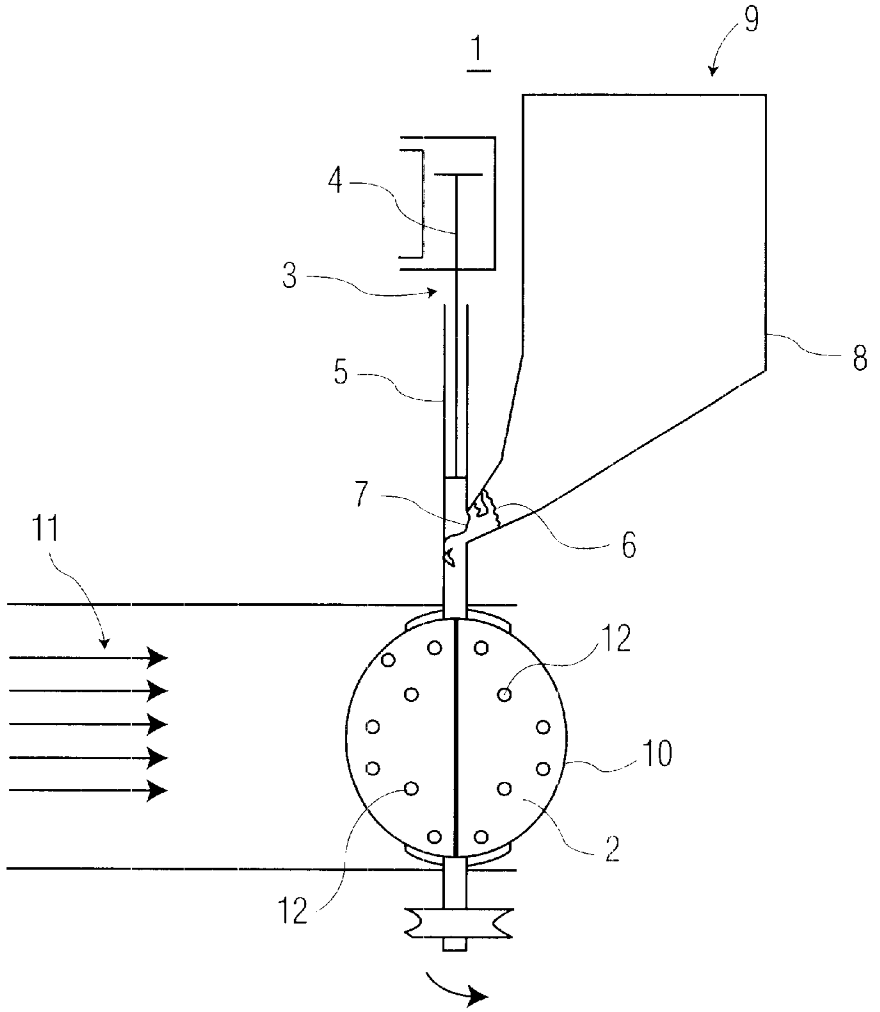
FIG. 1 shows a device for manufacturing a compact homogeneous lens employing the process according to one embodiment of the invention and a lens filled with thermoplastic granules which is obtained using said process.

FIG. 1 shows a device 1 for manufacturing a compact homogeneous sphere 2. It comprises a ram 3 having a vertical piston rod 4 which penetrates the vertical cylinder 5 of the ram 3. The pressure exerted on the piston rod 4 is used to compress the granule 6 coming from an opening 7 made in the periphery of the cylinder 5. These granules 6 are amassed in a reservoir 8 of a hopper 9. A mold 10, of spherical shape, placed at the end of the cylinder 5 is filled with granules 6 which drop under gravity from the opening 7 along the cylinder 5. The pneumatic ram 3 lightly compacts the granules 6 in the mold 10 at the end of the mold-filling step.

Hot air 11, regulated to be within an adjustable temperature range of 80° C. to 250° C., is blown through the mass of granules 6 by means of perforations or pores 12 made in the metal mold 10, which consists of two separable parts.

The dimensions of the spherical mold must be slightly greater than those of the sphere as finally produced, in order to take into account the expansion phenomenon that the granules experience when subjected to heat. The temperature of the blown hot air must be sufficient to soften the outer layer of the granules and thus create granule boundaries by the formation of the viscous phase following the softening of the outer layer of granules of the outer layer 13 of the sphere 2, as described in FIG. 2. However, the temperature chosen for the hot air must be less than a limiting temperature for preventing the granules of the outer layer from melting, so as to avoid shrinkage and deformation problems due to cooling a molten mass of large volume. The fact of not melting the granules allows them to keep their initial density and allows sufficient air to flow between them for rapid cooling.

To ensure good temperature homogeneity, the mold is rotated at a slow speed, of about 10 to 50 revolutions per minute, so as to avoid the centrifuging phenomenon. The thermal expansion of the granules due to the rise in temperature creates pressure inside the mold which ensures that those parts of the granules in contact with one another are welded. A temperature greater than the softening point is needed to melt the outer layer of the granules, but for a relatively short time so as not to melt them entirely, in order to preserve the volume and the density homogeneity. The temperature value and the blowing time are key parameters for achieving the final result and must be adjusted according to the thermoplastic and the volume to be converted. These parameters will also determine the amount of shrinkage of the finished sphere.

According to one particularly advantageous embodiment, the blowing time is extended at a constant temperature in order to make the hot air flow right into the core of the lens 2, the temperature rise causing the granules 6 to expand, thereby creating pressure inside the mold 10 allowing the welding to take place.

Next, the cooling is carried out by replacing the hot air with cold air flowing between the granules, which are not completely molten. This cooling causes a slight shrinkage, allowing the part to be demolded by opening the two parts of the mold.

The adjustable parameters on the manufacturing device 1 are the following:

- the pressure of the pneumatic ram, which may be up to 6 bar;
- the speed of rotation of the mold, from 1 to 50 revolutions per minute;
- the temperature of the hot air, from 80° C. to 250° C.;
- the hot-air blowing times and the cold-air blowing times.

It should be noted that this process is applicable mainly to amorphous materials because of the gradual way in which they soften. For semicrystalline materials, the rapid melting gives too narrow a conversion window.

Figure 2:
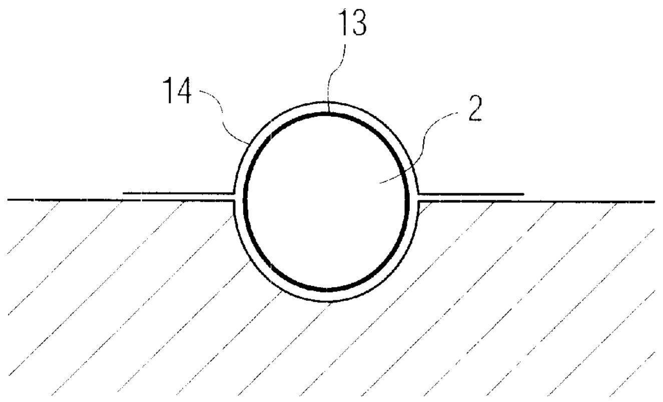
FIG. 2 shows a variant of the lens obtained by the process according to the invention.

FIG. 2 describes a variant of a sphere 2 obtained by the process according to the invention. In the case of the Luneberg lens used outdoors, this must be protected by a layer which protects against external attack, such as foul weather.

For this purpose, it is possible to thermoform a sheet 14 of thermoplastic of the same nature as the granules 6, having a thickness of a few tenths of a millimeter to 1 mm. This thermoforming is carried out in two operations, each of them occupying a half-sphere, followed by trimming of the parting line.

Figure 3:
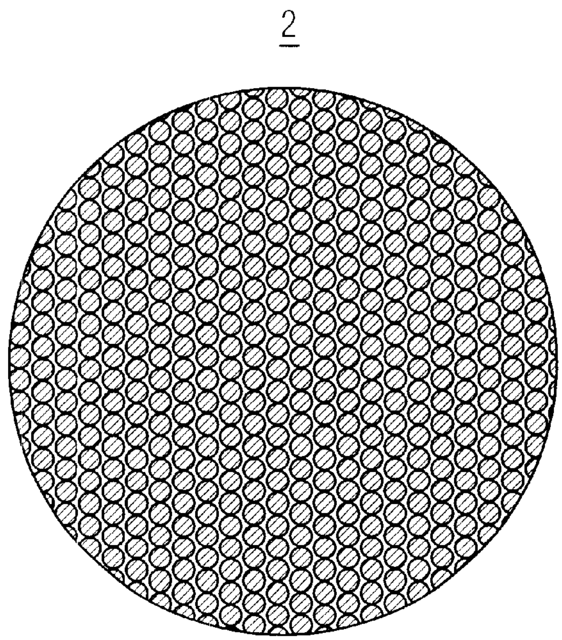
FIG. 3 shows a homogeneous lens according to a first embodiment of the invention.

FIG. 3 shows a homogeneous lens 2 350 mm in diameter made from polystyrene granules (polystyrene being referred to hereafter as PS for the sake of brevity). The main characteristics of the PS are detailed in the table below.

| | |
|---|---|
| Permittivity of the solid PS ($\epsilon_{r0}$) | 2.54 |
| Loss tangent (tanδ) | $5 \times 10^{-4}$ |
| Density of the solid PS ($d_0$) (g/cm$^3$) | 1.05 |
| Density of the PS granules (d) (g/cm$^3$) | 0.57 |
| PS fill factor ($F = d/d_0$) | 0.54 |
| Permittivity of the PS granules ($\epsilon_r$) | 1.68 |

Simulation of a lens having such characteristics leads to the following characteristics:

- a mass of 12.8 kg;
- a focal length f such that f=1.8 R (R being the radius of the lens), i.e. a focal length in the present embodiment of 315 mm;
- an approximation of the primary illumination source as the cosine to the power 8.

Simulations tending to determine the focal region around the focussing surface have led to the conclusion that, in order for there not to be any major degradation in the signal, the primary sources, not shown, must be placed at a distance of 13 mm around the focussing surface (f=1.8 R), this value being valid for the polystyrene lens and for an accepted phase variation of about 350.

Figure 4:
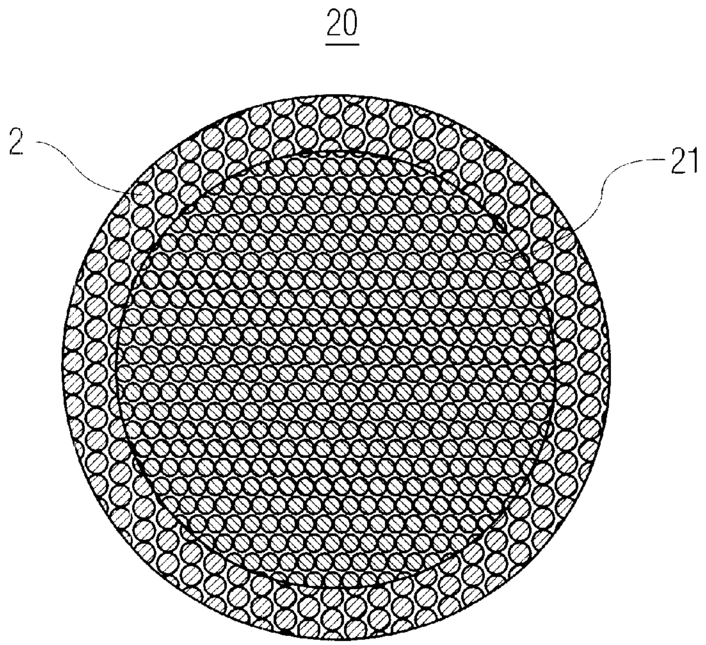
FIG. 4 shows a variant of the lens according to the invention.

FIG. 4 shows a two-layer lens comprising the lens 2 of FIG. 3 and an additional layer 21. The lens 2 is made of polystyrene granules whereas the lens 21 is composed of polypropylene granules. While keeping the characteristics of the lens 2 which were defined above, the main characteristics of the additional layer 21 made of polypropylene (denoted hereafter by PP) required for this lens 20 are detailed in the table below:

| | |
|---|---|
| Permittivity of the solid PP ($\epsilon_{r0}$) | 2.3 |
| Loss tangent (tanδ) | $5 \times 10^{-4}$ |
| Density of the solid PP ($d_0$) (g/cm$^3$) | 0.907 |
| Density of the PP granules (d) (g/cm$^3$) | 0.5 |
| PP granules fill factor ($F = d/d_0$) | 0.55 |
| Permittivity of the PP granules ($\epsilon_r$) | 1.60 |

Simulations on this double-material lens 20 lead to the following characteristics:

- Radius of the inner lens 2: $R_i$=86 mm;
- Mass of the lens: m=11.4 kg;
- Focal length: f=1.62 R (R=radius of the lens), i.e. a focal length of 284 mm;
- an approximation of the primary illumination source as the cosine to the power 6 (illumination at −12.5 dB at the edges of the lens).

In order not to excessively degrade the performance of the lens, particularly in the present case of the two-layer lens, simulations have demonstrated, according to the characteristics defined above, a maximum permitted variation in the permittivity in each of the layers of 0.02, i.e. an allowed variation of 0.02 about the defined value of 1.68 for the polystyrene granules and the same allowed variation about the value of 1.60 for the polypropylene granules. The permittivity of the granules is related to the fill factor F through the following equation:

$$\epsilon_r=[(1+2F)\,\epsilon_{r0}+2(1-F)]/[(1-F)\,\epsilon_{r0}+2+F],$$

Where $\epsilon_{r0}$ the permittivity of the plastic in question and F is the fill factor of the plastic.

The corresponding variation in the fill factor may be calculated using the following formula derived from the previous formula:

$$\Delta F=[\epsilon_{r0}+2-F(\epsilon_{r0}-1)]^2/[3(\epsilon_{r0}-1)(\epsilon_{r0}+2)]\,\Delta\epsilon_r.$$

The latter formula leads to the following variations in the fill factor for each of the layers:

$\Delta F=\pm 0.013$ for the PS granules ($F_{min}=0.530$ and $F_{max}=0.557$);

$\Delta F=\pm 0.015$ for the PP granules ($F_{min}=0.536$ and $F_{max}=0.566$).

Likewise, in the case of the lens 2, simulations have made it possible to determine a focal region around the focal surface of the lens where there would be no significant degradation of the signal. To fulfill this condition, the primary sources, not shown, would have to be placed at ±12 mm around the focussing surface (f=1.6 R).

It will be noted that when heating the granules, according to one of the variants of the invention, it will be possible to rotate the mold in different directions in order to achieve density homogenization of the granules.

According to another variant of the invention, when introducing the granules into the mold, these granules will be defined according to a density gradient in order to achieve the same density homogenization objective.

What is claimed is:

1. A focussing device comprising a Luneberg lens comprising a homogeneous volume of dielectric, comprising a granular agglomerate defined by a homogeneous granule size distribution of thermoplastic granules wherein at least one plurality of these granules being welded together by granule boundaries obtained by a partial melting of these granules in order to keep said volume consolidated.

2. The device as claimed in claim 1, wherein said plurality of granules is included at least within an outer layer of said homogeneous volume, said outer layer being relative to the outer surface of the volume extended toward the inside of said volume to a predetermined depth.

3. The device as claimed in claim 2, wherein said depth is of the order of a multiple of the received and/or transmitted half-wavelength.

4. The device as claimed in claim 1, wherein said plurality of granules is uniformly distributed within said volume.

5. The device as claimed in claim 1, wherein the permittivity $\epsilon_r$ of the volume of material composed of thermoplastic granules with a permittivity $\epsilon_{r0}$ is connected with a fill factor F, denoting the ratio of the volume actually occupied by the granules to the total volume of the lens, by the equation:

$$\epsilon_r=[(1+2F)\,\epsilon_{r0}+2(1-F)]/[(1-F)\,\epsilon_{r0}+2+F].$$

6. The device as claimed in claim 1, wherein the focal length of the lens depends on the refractive index n of the lens and on the accepted phase variation over the aperture of the radiation pattern of the lens, the refractive index of the lens being given by:

$$n=\epsilon_r^{1/2}.$$

7. The device as claimed in claim 1, wherein at least one additional layer covers said homogeneous volume of dielectric, said additional layer also comprising an agglomerate of thermoplastic granules of a material differing from that of the granules of said volume and having a density less than that of said volume.

8. The device as claimed in claim 1, wherein the granules of said volume are composed of polystyrene.

9. The device as claimed in claim 7 wherein the granules of the second layer are composed of polypropylene.

10. A process for manufacturing a Luneberg lens comprising a homogeneous volume of dielectric, comprising a step of forming said volume, wherein the volume comprises a granular agglomerate defined by a homogeneous size distribution of thermoplastic granules and in that said process comprises the following steps:

a step of heating the volume in order to raise the temperature of at least one outer layer of the volume to a transition temperature between the softening temperature of said material and the melting point of the material, the outer layer representing the outer layer of the volume extended into the volume to a predetermined depth and the transition temperature being defined by a phase change toward a viscous phase of at least part of said outer layer over said depth;

a step of cooling said outer layer in order to harden said outer layer.

11. The process as claimed in claim 10, wherein, during the heating step, the temperature is raised in order to melt at least the outer layer of the granules contained in said outer layer of the volume for the purpose of forming viscous granule boundaries binding the granules of the outer layer of the volume.

12. The process as claimed in claim 10, wherein the thickness of the outer layer is of the order of a multiple of the received and/or transmitted half-wavelength.

13. The process as claimed in claim 10, wherein the heating step is carried out until the entire volume has reached the transition temperature.

14. The process as claimed in claim 10, wherein the heating is carried out by convection.

15. The process as claimed in claim 10, wherein the heating time must be greater than a first temperature value in order to allow the outer layer of the granules of at least the outer layer of the volume to melt and must be less than a second temperature value in order to prevent these granules from completely melting.

16. The process as claimed in claim 10, wherein the process employs molding means for forming said volume, said molding means comprising porosities uniformly arranged over the outer surface of said molding means and the relative rotational speed of said molding means with respect to the blowing direction being less than a given speed in order to allow temperature homogeneity within at least the outer layer.

17. The process as claimed in claim 16, wherein the molding means are vibrated in order to mix the material.

18. The process as claimed in claim 10, wherein the heating temperature and the heating and cooling times are adjusted according to the thermoplastic used and to said volume of thermoplastic.

19. The process as claimed in claim 10, wherein said process employs pressing means, the pressure of which depends on the desired material density in said volume.

20. The process as claimed in claim 14, wherein the heating time is extended, at a constant temperature, in order to conduct heat into the entire volume.

21. The process as claimed in claim 10, wherein at least one sheet of thermoplastic is thermoformed around the volume.

22. The process as claimed in claim 10, wherein said volume is shaped so as to allow, in operation, a visibility in elevation of 10° to 90° and in azimuth of 360°.

23. The process as claimed in claim 10, wherein the volume is spherical.

24. A signal focussing device comprising a Luneberg lens having a homogeneous volume of dielectric, wherein the lens is produced by the process according to claim 10.

* * * * *